US006782507B1

(12) United States Patent
Dove

(10) Patent No.: US 6,782,507 B1
(45) Date of Patent: Aug. 24, 2004

(54) DOCUMENT SIZE MANAGEMENT METHOD AND DATA PROCESSING COMPUTER PROGRAM

(76) Inventor: Alex F. Dove, 120 Granada Dr., #15, Mountain View, CA (US) 94043

( * ) Notice: Subject to any disclaimer, the term of this patent is extended or adjusted under 35 U.S.C. 154(b) by 0 days.

(21) Appl. No.: 09/532,769

(22) Filed: Mar. 22, 2000

(51) Int. Cl.[7] .................................................. G06F 15/00

(52) U.S. Cl. ........................................ 715/517; 715/526

(58) Field of Search ................................. 715/517, 503, 715/501.1, 500.1, 513, 530, 520, 525, 526; 358/1.15, 1.18; 355/309; 382/284, 173; 705/14

(56) References Cited

U.S. PATENT DOCUMENTS

| | | | | | |
|---|---|---|---|---|---|
| 5,008,709 | A | * | 4/1991 | Shinada et al. | 399/86 |
| 5,321,486 | A | * | 6/1994 | Nanbu et al. | 399/14 |
| 5,828,818 | A | * | 10/1998 | Anzai | 358/1.18 |
| 5,956,738 | A | * | 9/1999 | Shirakawa | 715/517 |
| 5,978,612 | A | * | 11/1999 | Suzuki et al. | 399/16 |
| 6,226,658 | B1 | * | 5/2001 | Smith | 715/517 |
| 6,611,349 | B1 | * | 8/2003 | Vogt et al. | 358/1.15 |

* cited by examiner

*Primary Examiner*—Stephen S. Hong
*Assistant Examiner*—Dang Nguyen
(74) *Attorney, Agent, or Firm*—Nixon & Vanderhye P.C.

(57) ABSTRACT

A document size management method enables the configuration of a virtual document size from at least two standard document sizes. Virtual page dimensions are sent corresponding to maximum overlapping dimensions of the at least two standard size documents to thereby maximize the virtual page dimensions without requiring repagination for printing or display on any of the at least two standard document sizes. As a consequence, the document created using the configured virtual document size can be readily printed without reformatting to any number of designated standard document sizes.

12 Claims, 2 Drawing Sheets

DOCUMENT SIZE MANAGEMENT METHOD AND DATA PROCESSING COMPUTER PROGRAM

BACKGROUND OF THE INVENTION

The present invention relates to data processing applications and, more particularly, to a document size management method and subroutine for configuring a virtual document size from at least two standard document sizes.

Typical data processing programs include predefined formats for standard paper sizes. When configured for a particular paper size, a user can view the page layout as data is entered. A user can thus modify pagination, margins, etc. to customize the final arrangement of data prior to printing or other output such as forwarding by electronic communication or the like.

Standard paper sizes, however, vary around the world, and thus a document that is formatted according to a standard paper size in one country is incompatible with standard paper sizes of other countries, thereby detrimentally affecting the page layout of any "converted" document. For example, in the United States, a standard document size is 8.5" in width and 11" in length (8.5"×11"), and most data processing programs incorporate a default format for a page layout according to this standard document size. In Europe, however, a standard document size is so-called A4, which is 210 mm in width and 297 mm in length (assumed to be 8.27"×11.69"). When converting a document or spreadsheet or the like that has been previously formatted for a standard U.S. 8½"×11" document size to a standard European A4 document size, for example, repagination and configuration of the document will be required to accommodate the modified document size. This process, however, can be a burden for the converting user, and after repagination, the document may appear sloppy and misformatted.

SUMMARY OF THE INVENTION

It would thus be desirable to enable the formation of a global page layout that is compatible with two or more standard document sizes so that output of the document via printing, electronic communication or the like by a system with a different standard document size would not require repagination or other reformatting to preserve the pagination and appearance of the original document.

According to the present invention, a document size management method for configuring a virtual document size from at least two standard document sizes includes the steps of setting a virtual document width to no larger than a smallest width among the standard widths of the at least two standard document sizes, and setting a virtual document length to no larger than a smallest length among the standard lengths of the at least two standard document sizes. The virtual document dimensions may be set according to smallest dimensions of at least three standard documents sizes.

In a particular embodiment, a first standard document size is 8.5"×11" and a second standard document size is A4, such that the virtual document size according to the method of the invention is no larger than 8.27"×11".

In accordance with another aspect of the invention, a document size management method for configuring a virtual document size from at least two standard document sizes includes setting virtual page dimensions corresponding to no larger than maximum overlapping dimensions of the at least two standard size documents to thereby maximize the virtual page dimensions without requiring repagination for printing or display on any of the at least two standard document sizes.

In accordance with still another aspect of the invention, a data processing or spreadsheet computer program includes a document size management subroutine that effects configuration of a virtual document size from at least two standard document sizes.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
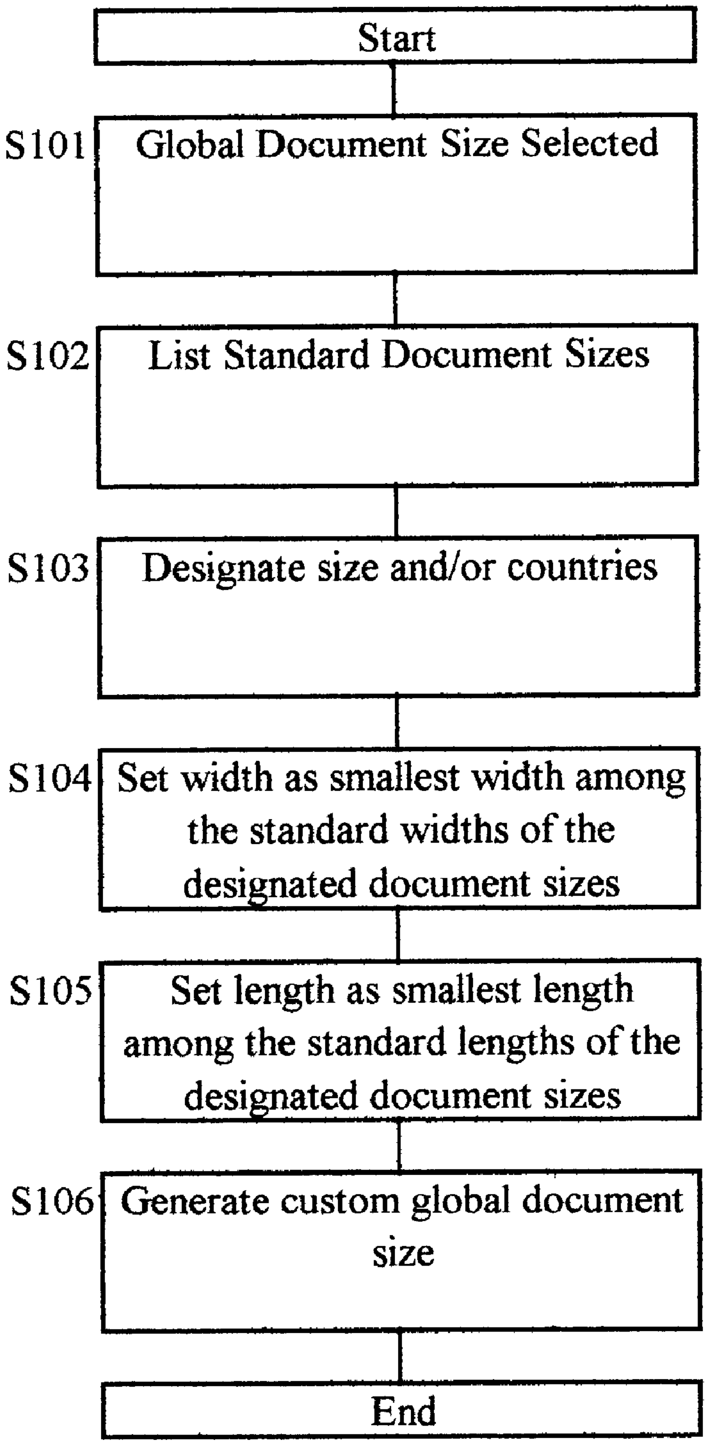
FIG. 1 is a flow diagram of the process according to the present invention.

A flow diagram for the document size management method according to the invention is illustrated in FIG. 1. The document size management method according to the invention is applicable to any data processing configuration incorporating page layouts corresponding to standard document sizes. For example, the method according to the invention is applicable to data processing programs, spreadsheet programs, electronic mail communication programs, Internet applications and the like. In addition, although the invention is described using U.S. standard document size 8.5"×11" for a first standard document size and European standard document size A4 for a second standard document size, this application is exemplary, and the invention is not meant to be limited to the described exemplary standard document sizes. Moreover, the manner in which the data processing program generates displays and output according to the virtual document size configured according to the method of the invention does not form part of the present invention. Those of ordinary skill in the art will contemplate various known methods for implementing the formats once derived by the method of the present invention.

In this context, referring to FIG. 1, the software program to carry out the method according to the invention will include a format option to enable the user or programmer to select a format for a global document (step S101). Upon selection of the global document format, the system lists continents and/or countries having various standard document sizes (step S102). The standard document sizes for various continents and/or countries are pre-established and are incorporated into the program software.

In step S103, the user or programmer designates the various sizes and/or countries for which the global document size is to be configured. In this context, for example, if the user or programmer desires to generate a document for processing in the United States and Europe, the user or programmer would designate 8.5"×11" as a standard document size for the United States and A4 as a standard document size for Europe. In step S104, the system then sets a virtual document width to a smallest width among the standard widths of the designated document sizes. In a similar context, in step S105, the system sets the virtual document length to a smallest length among the standard lengths of the designated standard document sizes. Finally, in step S106, the custom global document size or "virtual document size" is generated and set as a current page layout for processing.

Figure 2:
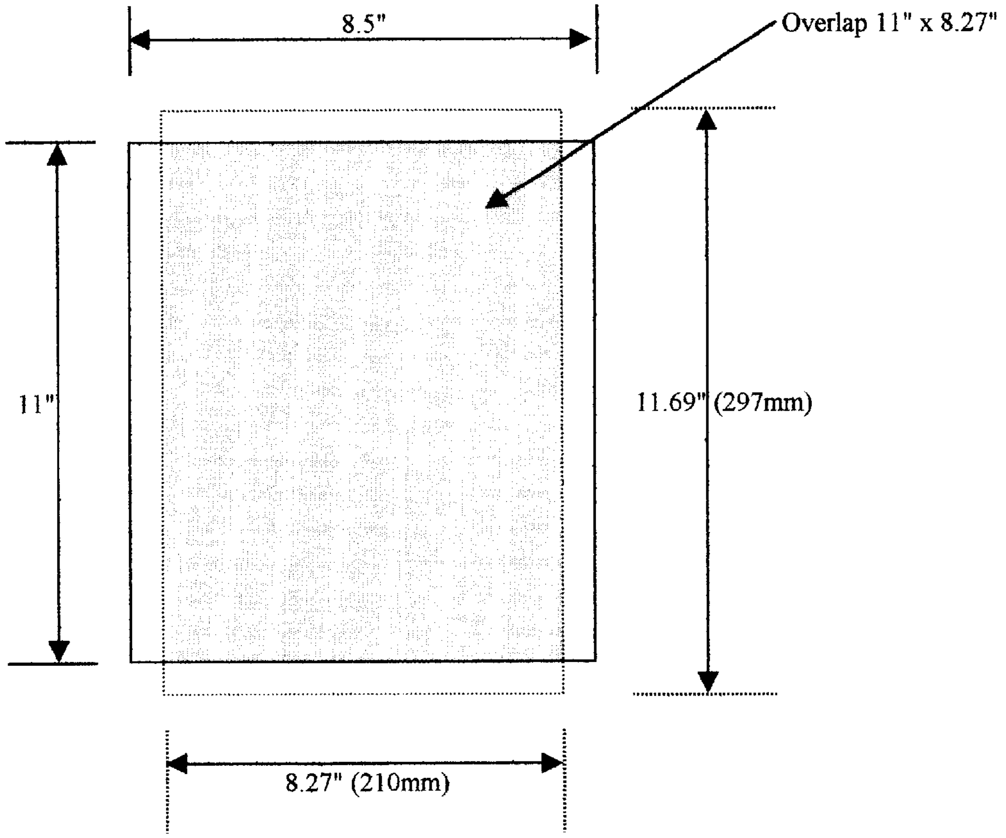
FIG. 2 illustrates an exemplary embodiment, configuring a virtual document size from two standard document sizes.
Figure 3:
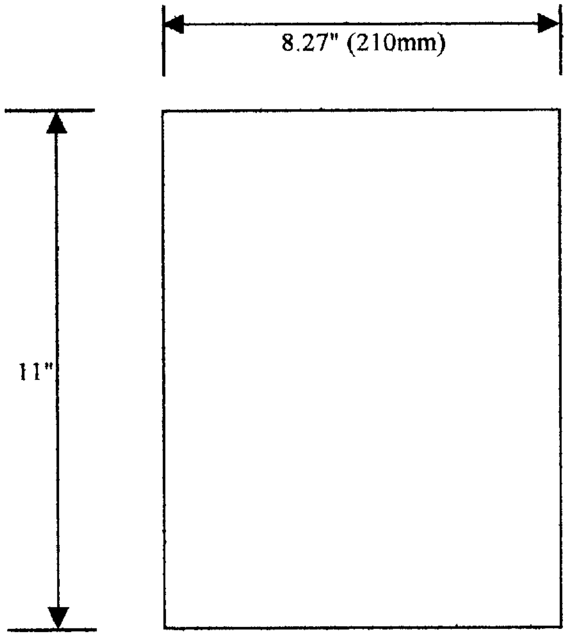
FIG. 3 illustrates an exemplary virtual document size resulting from the process of the invention applied to the example document sizes in FIG. 2.

With this method, a user or programmer is able to maximize virtual page dimensions without requiring repagination for printing or display on any of the designated standard document sizes. As shown in FIG. 2, the virtual page dimensions thus correspond to maximum overlapping dimensions of the designated standard size documents. With the example using standard U.S. 8.5"×11" and standard European A4, the smallest width among the standard widths is 8.27", and the smallest length among the standard lengths is 11", corresponding to maximum overlapping dimensions of the two standard size documents. The overlapped area is shown in FIG. 2 with cross hatching. The resulting virtual document size is shown in FIG. 3.

According to the principles of the present invention, the document size management method enables maximized virtual page dimensions without requiring repagination for printing or display on any number of standard document sizes. A document thus created in the U.S., for example, could thus be processed for printing in Europe, for example, without the European user requiring repagination or other formatting procedures to preserve the pagination and appearance of the original document.

Preferably, the paper size may be automatically selected based on the virtual paper size and the standard paper sizes of the selected printer. Other methods could include setting preferences within the application that are country-based with an address to the print driver concerning which paper size to select depending on the virtual paper size. In this context, the parameters for global document sizes determined according to the principles of the present invention may form part of the printer or display driver such that the user need only select a preferred document size from a pre-programmed list of document sizes. Alternatively, the program could incorporate a dialog box to ask the user which actual paper size to use when printing from a virtual paper size.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A document size management method for configuring a virtual document size from at least two different document sizes each having a width and a length, respectively, the method comprising:

(a) setting a virtual document width to no larger than a smallest width among the widths of the at least two document sizes;

(b) setting a virtual document length to no larger than a smallest length among the lengths of the at least two document sizes; and (c) creating an original document in a page layout corresponding to the virtual document size by inputting document content, wherein the original document created in the virtual document size can be is outputtable using any of the at least two document sizes, without in identical appearance.

2. A document size management method according to claim 1, wherein steps (a) and (b) are practiced by setting virtual document dimensions according to smallest dimensions of at least three different document sizes.

3. A document size management method according to claim 1, wherein a first document size is 8.5"×11" and a second document size is A4, such that the virtual document size according to steps (a) and (b) is no larger than 8.27"×11".

4. A computer-implemented document size management method for configuring a virtual document size from at least two different document sizes, the method comprising setting virtual page dimensions corresponding to no larger than maximum overlapping dimensions of the at least two different sized documents to thereby maximize the virtual page dimensions, and defining a page layout corresponding to the virtual page dimensions, and creating an original document by inputting document content into the page layout, wherein the original document created in the virtual document size is outputtable using any of the at least two document sizes in identical appearance.

5. A document size management method according to claim 4, wherein a first document size is 8.5"×11" and a second standard document size is A4, such that the set virtual page dimensions are no larger than 8.27"×11".

6. A word processing or spreadsheet computer program embodied in a computer reaable medium comprising a document size management subroutine that effects configuration of a virtual document size from at least two different document sizes by setting virtual page dimensions corresponding to no larger than maximum overlapping dimensions of the at least two different sized documents to thereby maximize the virtual page dimensions, the subroutine enabling defining a page layout corresponding to the virtual page dimensions, and creating an original document by inputting document content into the page layout, wherein the original document created in the virtual document size is outputtable using any of the at least two document sizes in identical appearance.

7. A word processing or spreadsheet computer program according to claim 6, wherein the document size management subroutine is programmed to enable:

(a) setting a virtual document width to no larger than a smallest width among widths of the at least two document sizes; and (b) setting a virtual document length to no larger than a smallest length among lengths of the at least two document sizes.

8. A word processing or spreadsheet computer program according to claim 7, wherein a first document size is 8.5"×11" and a second document size is A4, such that the virtual document size according to (a) and (b) is no larger than 8.27"×11".

9. A word processing or spreadsheet computer program according to claim 7, wherein (a) and (b) are practiced by setting virtual document dimensions according to smallest dimensions of at least three different document sizes.

10. A document having a page layout configured according to the method of claim 1.

11. A document having a page layout configured according to the method of claim 4.

12. A document having a page layout configured according to the method of claim 6.

* * * * *